United States Patent [19]

Huling

[11] 4,263,254

[45] Apr. 21, 1981

[54] APPARATUS FOR AND METHOD OF CONSERVING ENERGY IN PASTEURIZERS

[75] Inventor: James K. Huling, Belleville, Ill.

[73] Assignee: Barry-Wehmiller Company, St. Louis, Mo.

[21] Appl. No.: 62,693

[22] Filed: Aug. 1, 1979

[51] Int. Cl.³ .......................... A61L 2/04; A61L 2/24; A23C 3/027; A23L 3/04

[52] U.S. Cl. ....................................... 422/25; 99/361; 99/362; 99/483; 422/105; 422/114; 422/302; 422/304; 426/397

[58] Field of Search ................. 422/302, 304, 25, 114, 422/115, 105; 426/397; 99/361, 362, 483

[56] References Cited

U.S. PATENT DOCUMENTS

| | | | |
|---|---|---|---|
| 2,282,187 | 5/1942 | Herold et al. | 99/362 X |
| 2,333,544 | 11/1943 | Meyer | 99/361 |
| 2,466,769 | 4/1949 | Herold et al. | 99/362 X |
| 2,658,608 | 11/1953 | Wehmiller | 198/776 |
| 3,622,357 | 11/1971 | Tillman | 99/362 X |

FOREIGN PATENT DOCUMENTS

2369866 7/1978 France ........................................ 99/483

Primary Examiner—Barry Richman
Attorney, Agent, or Firm—Gravely, Lieder & Woodruff

[57] ABSTRACT

In the pasteurizing of beverages and comestibles in closed containers, the containers are progressively raised in temperature to the pasteurizing temperature and after an appropriate time progressively cooled down in apparatus which practices a method for storing heat in water and applying the heated water from storage so that skips in the supply of the containers will be accommodated to the end that a saving in steam can be realized. The method realizes saving of substantial amounts of energy, as well as avoiding dumping overly warm water into local sewers to disturb the ecological balance, and also avoids the use of refrigeration to reduce temperature of the discharge water.

5 Claims, 4 Drawing Figures

APPARATUS FOR AND METHOD OF CONSERVING ENERGY IN PASTEURIZERS

BACKGROUND OF THE INVENTION

In the art of effecting pasteurization of beverages and comestibles in closed containers it is common to cause the containers to travel through a closed chamber where the temperature varies in such a way as to gradually elevate the temperature of the contents of the containers to the pasteurizing temperature level and to thereafter gradually reduce the temperature of the contents to a level where the containers can be safely returned to the outside. Commercially available apparatus for accomplishing the foregoing sequence in effecting pasteurization is disclosed in the prior art by Herold et al in U.S. Pat. No. 2,282,187 which issued May 5, 1942. This patent relates to pasteurizing the contents in containers by subjecting the same to successive sprays of liquid to preheat, pasteurize and cool the containers. The disclosure made by Herold et al provided for a gradual temperature change in the containers as they are caused to pass from temperature zone to temperature zone, and in proceeding in this manner a considerable quantity of live steam heat must be supplied in order to maintain the pasteurizing liquid at the required pasteurizing temperature. At the time of this disclosure there was very little thought given to the effect on the local ecology by the release of hot water to the sewer at a temperature above what could be considered normal.

An improvement was disclosed in U.S. Pat. No. 2,466,769 by Herold et al which issued Apr. 12, 1949. The disclosure in this patent is directed to a system whereby a small size pasteurizer could efficiently and economically perform all of the functions of varying temperatures of traveling containers by the economical use of hot and cold temperature regulating fluids. However, the disclosure called for the use of large quantities of live steam in order to obtain the desired temperature levels.

The assignee in the case of the above mentioned Herold et al U.S. patents made and sold single deck and double deck pasteurizers embodying regenerated systems by interchanging water between heating and cooling zones so as to obtain a economical use of live steam and water. The regenerative system obtained economy in the use of steam and water by a counterflow of hot water against cool product at the load end of the pasteurizer and cool water against hot product at the cooling end of the pasteurizer. The pasteurizers as just above described were available commercially in about 1953 with respect to the regenerative system.

These examples of pasteurizers have means for obtaining a thermal balance when skips occur in the supply of containers by introducing either water or steam as needed into the regenerative zones. The used water overflowed from the pasteurizer at high temperatures sometimes approaching 140° F. which is harmful to the ecology at that elevated temperature. This invention will, in effect, reduce the consumption of heat energy in order to achieve this thermal balance and at the same time allow the discharge water from the pasteurizer to be at an acceptable temperature.

BRIEF DESCRIPTION OF THE INVENTION

The present invention is directed to improvement in apparatus for and methods of conserving energy in pasteurizers.

The objects of the present invention are to provide apparatus capable of practicing the method for obtaining a thermal balance between successive preheating zones and precooling zones on opposite sides of a pasteurizing zone during the movement of skips through those zones, and to provide means for storing heated processing water at a place where the temperature thereof can be maintained or added to so as to reduce the call for live steam.

Other objects of the invention are to effect a savings in reducing the need for refrigeration in order to obtain desired water temperature levels, and to avoid releasing process water to a local sewer at a temperature that would create ecological problems.

Other objects of the present invention will be pointed out in the following specification.

BRIEF DESCRIPTION OF THE DRAWINGS

The present invention is illustrated in certain preferred embodiments of the accompanying drawings, wherein.

DETAILED DESCRIPTION OF THE INVENTION

Figure 1:
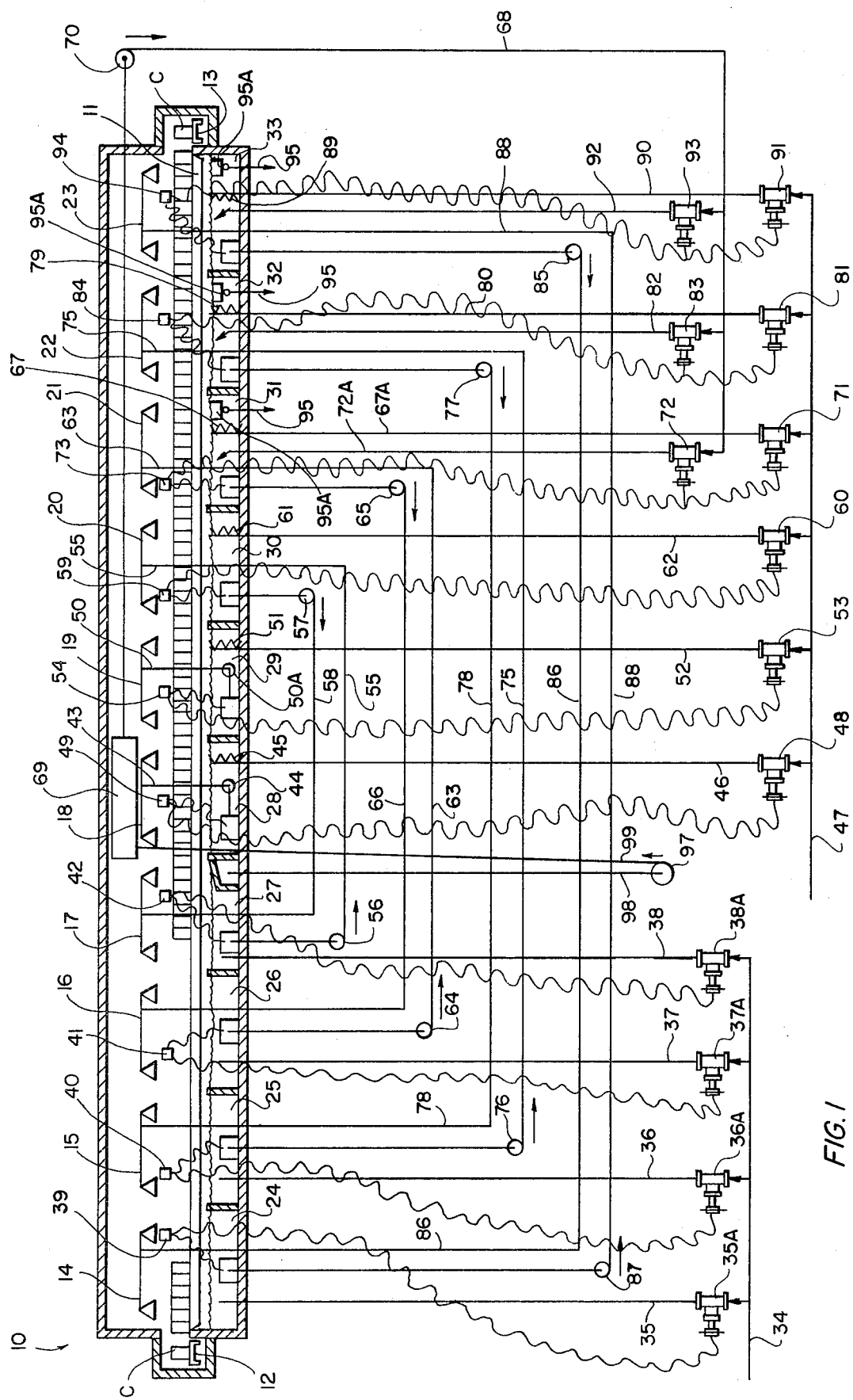
FIG. 1 is a schematic longitudinal view of a single deck pasteurizer embodying a system for preheating, pasteurizing, and cooling a conveyed product in which the preheating and cooling zones of the pasteurizer are arranged in interconnected cooperation, the view illustrating the presence of a skipper in the preheating zones.

A desirable form of the present invention is shown in FIG. 1 of the drawings and comprises apparatus which is associated with an elongated housing 10 having conveyor 11 of the general type shown in U.S. Pat. No. 2,658,608 granted Nov. 10, 1953 for Conveying Apparatus of F. W. Wehmiller. Other suitable means may be used to move the product to be pasteurized through zones which progressively raises the temperature to the pasteurizing temperature and then progressively lowers the temperature before returning the product to ambient temperature conditions. The product, whether metallic containers or glass bottles, is fed into the housing 10 by a delivery conveyor 12 and is discharged by the conveyor 11 onto a discharge conveyor 13.

More specifically, the apparatus of FIG. 1 includes a series of preheating showering devices 14, 15, 16 and 17 leading up to pasteurizing showering means 18, and a pasteurizering temperature holding device 19 followed by a series of precooling showering devices 20, 21, 22 and 23. The preheating showering devices are located such that the liquid will fall through the conveyor 11 and into collecting compartments 24, 25, 26 and 27. The pasteurizing showering means is located above a compartment 28, the pasteurizing holding device above compartment 29, and the precooling showering devices are positioned above compartments 30, 31, 32 and 33 such that the liquid will fall through the conveyor 11 and be collected in these compartments.

Process water from a suitable source 34 is supplied through pipes 35, 36, 37 and 38 to the respective compartments 24, 25, 26 and 27. Control valves 35A, 36A, 37A and 38A are inserted in those pipes respectively, and the valves are under control of temperature responsive sensors shown respectively at 39, 40, 41 and 42 so as to measure the temperature of the liquid spray from the showering devices 14, 15, 16 and 17 respectively.

The pasteurizing showering device 18 is connected by pipe 43 to pump 44 disposed in the liquid compartment 28. The liquid in that compartment is heated by a steam heating means 45 supplied by pipe 46 from a source of steam 47 under control of valve 48 which is responsive to a sensor 49 at the showering device 18. The sensor 49 is modulated by the temperature at the inlet suction screen adjacent the pump 44.

Following the pasteurizing zone, the showering device 19 is supplied by pipe 50 from pump 50A receiving liquid through screen in compartment 29. The liquid is temperature controlled by a steam heating means 51 supplied through pipe 52 from valve 53 in steam source 47. Temperature sensor means 54 responsive to the showering liquid modulates the steam valve 53 in relation to the temperature at the screen inlet to pump 50A. The supply of liquid to showering device 20 is by pipe 55 connected to the outlet of pump 56 which draws liquid at a screened inlet in compartment 27. The showered liquid collected in compartment 30 is transferred through screened inlet for pump 57 to pipe 58 which supplied showering device 17. The temperature of the showering device 20 is sensed by sensor 59, and that device controls the admission of steam from source 47 at valve 60 to heating means 61 by pipe 62. The valve 60 is subject to modulation by the temperature at the inlet to pump 57.

The next following showering device 21 is supplied with liquid by pipe 63 which is the outlet of pump 64 drawing liquid from compartment 26 at its screen inlet. The liquid from showering device 21 is collected in compartment 31 and transferred through the screened inlet of pump 65 by delivery pipe 66 to the showering device 16 where the liquid is collected in compartment 26. The temperature of the liquid in compartment 31 is heated by heating means 67, but it is also heated by hot liquid brought thereto by pipe 68 from a source of heated liquid 69 moved by pump 70. The steam for heating means 67 is supplied by pipe 67A and controlled by a valve 71, and the heated liquid from pipe 68 is suppled by pipe 72A controlled by valve 72. The valves 71 and 72 are subject to control by sensor 73 in the showering from device 21, modulated by the temperature at the screened inlet to pump 65.

Showering device 22 is supplied with liquid by pipe 75 from pump 76 which draws liquid at screened inlet in compartment 25. The liquid collected in compartment 32 from showering device 22 is transferred by pump 77 drawing from compartment 32 and delivering by pipe 78 to showering device 15. The temperature of the liquid in compartment 32 is maintained by heating means 79 supplied by pipe 80 through valve 81 from source 47, as well as by heated liquid received from pipe 68 at pipe 82 under control of valve 83. The valves 81 and 83 are subject to control by the sensor 84 which is modulated by the temperature at the screened inlet to transfer pump 77. In like manner, showering device 23 has its liquid collected in compartment 33 and transferred through screened inlet to pump 85 and by delivery pipe 86 to showering device 14. The liquid collected in compartment 24 is transferred through screened inlet to pump 87 and deliverd by pipe 88 to the showering device 23. The liquid in compartment 33 is subject to heat from the heating means 89 connected by pipe 90 through valve 91 to steam source 47, as well as by heated liquid from pipe 68 through pipe 92 and valve 93. The valve 91 and 93 are controlled by temperature sensor 94 in the showering liquid, modulated by the temperature at the screened inlet to pump 85. It is seen that each of the compartments 31, 32 annd 33 are provided with a liquid drain pipe 95. All of these drain pipes may be connected to a sewer, or the liquid so discharged may be collected and cooled in a tower or by refrigeration (not shown) and reused as part of the process liquid brought in at pipe 34.

Figure 4:
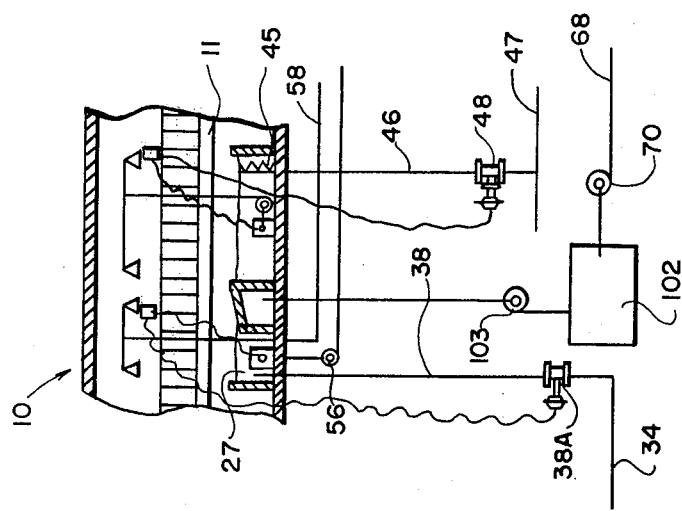
FIG. 4 is a view similar to FIG. 3 but showing a modification of the liquid storage means.
Figure 3:
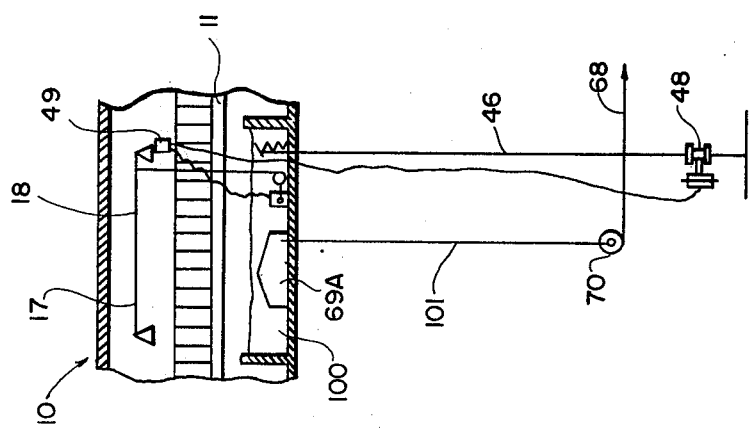
FIG. 3 is a fragmentary schematic view of a portion of the pasteurizer of FIG. 1, but modified in respect to means for storing a heated liquid for subsequent use in the cooling zones of the pasteurizer.

It has been pointed out that there is a hot liquid source 69 positioned at the top of the pasteurizing zone (FIG. 1) where it is able by radiation from the pasteurizing zone to add heat to the liquid moved by pump 97 through pipe 98 from the compartment 27 to pipe 99 connected to the source 69. Certain modifications of this arrangement may be selected. As for example, the fragmentary view of FIG. 3 illustrates the location of the source of heated liquid 69A disposed directly in an enlarged compartment 100 which is made up of the previously designated compartment 27 and 28 in FIG. 1. The heated liquid is transferred by pipe 101 to pump 70 and delivery pipe 68 as before described. A further modification is seen in the fragmentary view of FIG. 4 where, instead of locating the compartment above the pasteurizing zone as in FIG. 1, a remotely located holding tank 102 may be supplied by pump 103 from compartment 27. The liquid from tank 102 is delivered by pump 70 to pipe 68 as before described.

Referring again to FIG. 1 it shall be assumed for this discussion that the apparatus 10 has a full complement of product containers C being delivered by conveyor 12 and being carried away at conveyor 13. The several showering zones identified by the showering devices 14, 15, 16, 17, 18, 19, 20, 21, 22 and 23 are also filled with the product containers. It is assumed also that the containers C arrive at a temperature of about 34° F. They are moved by the conveyor 11 through the several preheating zones of showering devices 14, 15, 16 and 17 where the temperature is brought up in stages to the pasteurizing temperature in zone of showering device 18 which is about 140° F. The travel of the containers C then goes through progressively cooler zones of showering devices 19, 20, 21 and 22 until at the last showering device 23 the temperature is lowered to about 70° to 80° F. Shortly after the apparatus 10 has been in full operation it attains a substantial thermal balance with the containers C where heat extracted in the cooling zones is made available to bring the container temperature up from the low entering temperature level to one more compatible with the pasteurizing zone temperature. The foregoing is considered to be generally normal operation known in this art.

In many cases a circumstance arises where product is not present such as the failure of a batch of containers to arrive and that creates a gap or "skip" in the preheat zones. The "skip" calls for the addition of process water to supply the precooling zones in an effort to maintain the thermal balance between the incoming and outgoing ends of the pasteurizer. The process water added is used and becomes excess liquid so must be dumped at a higher temperature, such as at a level of about 120° F. The excess water can be sewered but is harmful to the ecological state, or it can be pumped to a cooling tower or chiller at the expense of energy consumption. Furthermore, when the "skip" reaches the precooling zones it is necessary to inject steam as a substitute for the missing hot product in order to maintain a thermal balance. The production of steam is an energy consumer, and this adds to the cost of pasteurizer operation.

The present invention is, therefore, directed toward overcoming the foregoing problems by storing the high temperature excess water and reusing it instead of steam when a "skip" occurs. This reuse extracts the thermal value and lowers the water temperature to a safe level before it is discharged. Thus, the ecological status is not disturbed and the cost of chilling or operating a cooling tower is reduced.

According to the "skip" conditions shown in FIG. 1 no containers C are passing through zones at showering devices 15 and 16. This upsets the thermal balance with the associated zones at precooling showering devices 21 and 22 because these zones are interrelated by operation of pumps 64 and 65 between showering devices 16 and 21, and by operation of pumps 76 and 77 between showering devices 15 and 22. The temperature sensors 40 and 41 sense an increase in temperature because there are no containers present to be preheated and thereby absorb heat. Thus, the sensors 40 and 41 act to reduce the heat picked up from the liquid supplied by pumps 77 and 65 by calling for process water through opening valves 36A and 37A. This action makes up for the lack of cool liquid in the pre-cooling zones. As added processing water enters the compartments 25 and 26 it overflows and ends up in compartmet 27 where there exists a higher temperature of the order of 120° F. This excess water is moved by pump 97 into the storage source 69 where its heat level is kept up by radiant heat from the pasteurizing zone.

Figure 2:
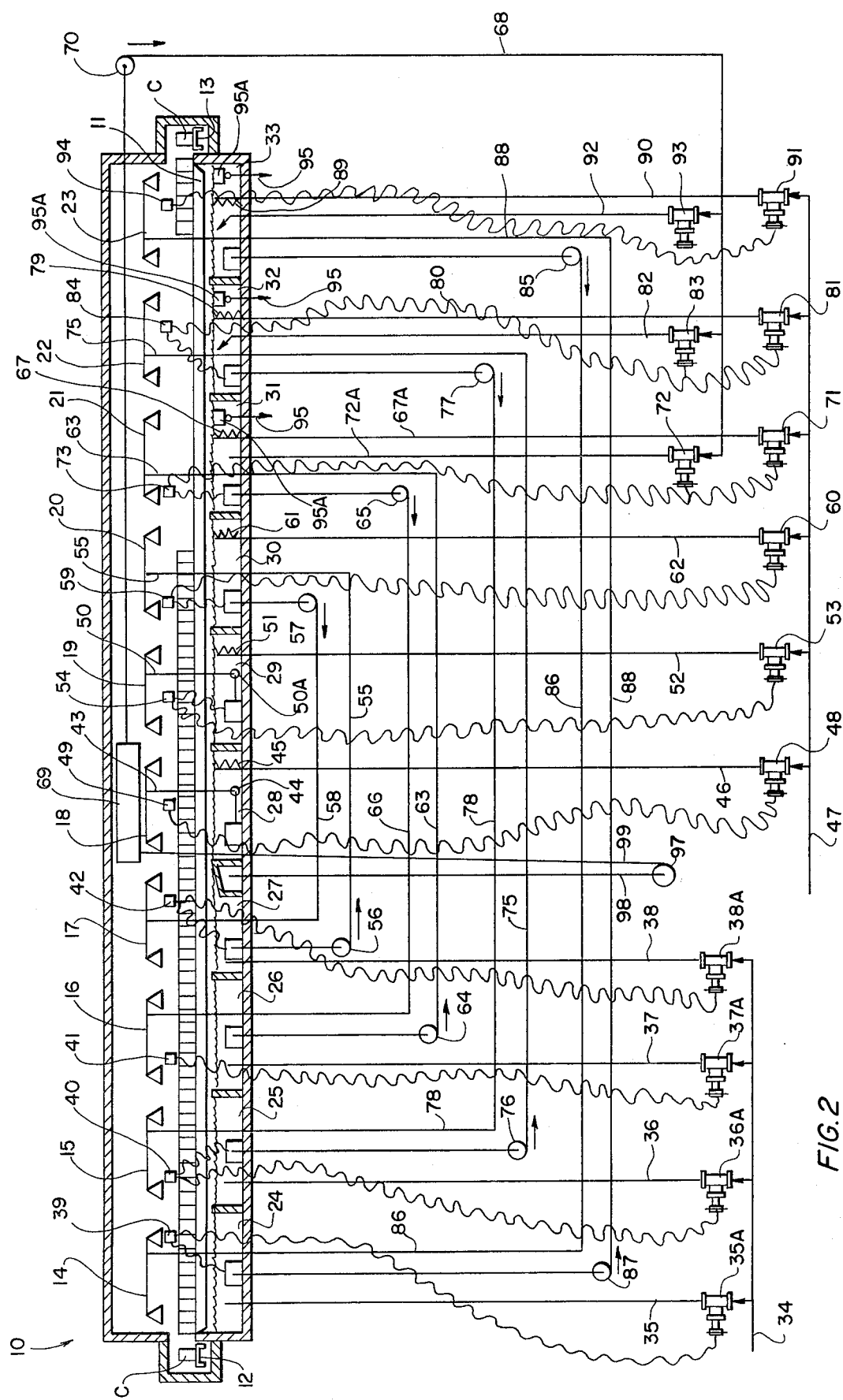
FIG. 2 is a view similar to FIG. 1 but differs therefrom in the showing of the skipper when it has reached the cooling zones.

It can be readily seen that the apparatus of FIG. 2 is substantially the same as that described for FIG. 1, and the reference characters are essentially the same to designate parts, piping, pumps and other components which are repeated. When the "skip" reaches the precooling showering device 21 and 22 (FIG. 2) the liquid is not intercepted by hot containers and so falls directly into compartments 31 and 32 respectively without temperature change which is cooler than required at the preheating zones at showering devices 15 and 16. The zone related with showering device 23 is also affected, so the sensors 73, 84 and 94 open the valves 72, 83 and 93 respectively and release the hot storage liquid from source 69 to supply the preheating zones at showering devices 14, 15 and 16 and effect proper preheating of the containers. This action operates to maintain a thermal balance between the entering preheating zones and leaving precooling zones of the apparatus. If the heat contained in the liquid supplied by pump 70 to zones 21, 22 and 23 is sufficient to meet the needs in preheating zones 14, 15 and 16, the thermal sensors will not actuate the normally closed valves 71, 81 and 91 in the steam supply pipe 47. Thus, no steam utilization occurs. As the liquid supplied by pump 70 enters the compartments 31, 32 and 33 it raises the level of the liquid to the stage where it can flow into the drain boxes 95A and be conducted away by pipes 95. The pipes 95 may be connected to an adjacent sewer to discharge liquid off the top layer in compartments 31, 32 and 33 which is the cooler liquid from the showering devices 21, 22 and 23 supplied by heat spent liquid pumped from compartments 24, 25 and 26 associated with the transfer of heat to the containers for preheating purposes.

The above described apparatus operates to establish a substantial thermal balance between the container preheating zones in advance of the pasteurizing zone and the container precooling zones following the pasteurizing, especially when a skipper in the supply of containers occurs and is moved through the apparatus 10. It appears from FIGS. 1 and 2 that there is a definite piping interconnection from the respective preheating zone defined by showering device 14 and thr precooling zone defined by showering device 23. The same relationship obtains for preheating zones defined by showering devices 15, 16 and 17 and precooling showering devices 22, 21 and 20 respectively. In this relationship, when (FIG. 1) a skipper appears at the preheating zones there is no container complement to absorb the heat extracted from the containers in the related precooling zones, so ineffective precooling takes place in the precooling zones. By introducing process water from supply 34 a cooling liquid is supplied to the preheating compartments 24, 25 and 26 which liquid is moved by pumps 87, 76 and 64 to the precooling showering devices 23, 22 and 21 to absorb the heat in the full complement of containers moved in those zones.

When the skipper above noted reaches the precooling zones (FIG. 2) the reverse thermal interchange needs to be established. This is accomplished by delivering the stored heated liquid from source 69 (or 100 or 102) to the compartments in the precooling zones so it may be pumped to the associated preheating showering devices for raising the temperature of the containers moved into those zones for preheating.

The foregoing description has set forth a preferred embodiment of apparatus for operating a pasteurizer under conditions that result in a more economical operation. One of the important and unique features is in reducing the call for steam outside of the usual steam necessary to bring the spray temperatures up to proper pasteurizing levels. It is also unique in the operation of the present apparatus to avoid dumping hot water into a local sewer at temperatures that upset the local ecology. Furthermore, the apparatus is operated in a manner that is uniquely designed to obtain a substantially balanced thermal load between the preheating sections and the precooling sections located on opposite sides of the usual pasteurizing section. This unique feature is accomplished by utilizing local ambient water under controlled conditions when a gap or skip occurs in the flow of containers, and to collect and store hot liquid so that it may be utilized at such times as the skip reaches the precooling zones. The storage and reuse of the hot liquid replaces to a large extent the use of steam to provide the heat source, and this is of great advantage in some plant installations where expensive fuel is necessary in order to produce the steam.

What is claimed is:

1. A method of operating a pasteurizer having a conveyor for transporting containers from an inlet to an outlet through a pasteurizing zone comprising: establishing a first series of preheating showering zones for delivering a heated liquid on to a plurality of containers for preheating the containers; establishing a second series of precooling showering zones for delivering a cooling liquid on to said containers for precooling the containers; establishing a showering zone between the first and second series of showering zones for delivering a liquid on to said containers at a pasteurizing temperature; connecting a source of cool ambient liquid with the first showering zones; establishing a storage source of heated liquid through fluid connection with one of the first series of preheating showering zones; connecting the storage source of heated liquid to the second showering zones; and controlling in a predetermined sequence the use of the ambient liquid for accommodating the presence of a skipper arising in the first series of showering zones and controlling the use of the storage source of heated liquid for accommodating the presence of the skipper reaching the second series of showering zones to the outlet.

2. The method set forth in claim 1, wherein the predetermined sequence of control in such that the presence of a skipper effects introduction of the cool ambient liquid through the first showering zones and into the second showering zones followed by the introduction of the storage source of heated liquid through the second showering zones and into the first showering zones.

3. The method set forth in claim 1, wherein the predetermined sequence of control is such that the ambient liquid is utilized to simulate the presence of a relatively cool container load within the second zones and thereby effect precooling of the heated liquid therein and the storage source of heated liquid is utilized to simulate the presence of a relatively hot container load within the second zones and thereby effect preheating of the cooling liquid therein so that a thermal balance is achieved between the first and second series of showering zones.

4. The method as set forth in claim 1 wherein the preheating zones are connected in the order of their series in liquid flow communication with the inverse order of the series of precooling zones.

5. Apparatus for selectively varying the temperature of traveling containers so as to maintain a substantial thermal balance between heating up containers prior to pasteurizing and cooling down containers following pasteurizing comprising: a plurality of container heating up zones, a plurality of container cooling down zones, a pasteurizing zone between said heating up and cooling down zones, liquid transfer connections associating said heating up zones and said cooling down zones for interchanging the heat picked up by the liquid showered upon the heated containers in said container cooling down zones and heat released from the liquid showered upon the cool containers in said container heating up zones, a source of ambient process liquid connected into said heating up zones, a heated up liquid storage source connected into said cooling down zones for delivery of heated up liquid into said heating up zone, a source of steam connected to said pasteurizing zone intermediate said heating up zones and cooling down zones, one container heating up zone being adjacent said pasteurizing zone, a liquid connection between said one container heating up zone and said storage source for delivering heated liquid to said storage source; and control means in said container heating up and cooling down zones responsive to changes in temperature of the liquid transferred therebetween for sequentially selectively admitting process liquid into said heating up zones from said ambient source to simulate the presence of a skipper in the heating up zones and releasing heated up liquid into said cooling down zones from said storage source to simulate the presence of said skipper in the cooling down zones, whereby the cooling down zones and heating up zones are in substantial thermal balance.

* * * * *